UNITED STATES PATENT OFFICE.

WILLIAM HERBERT LOWE, OF BRONDESBURY, ENGLAND, ASSIGNOR TO THE FLOAT ELECTRIC COMPANY, LIMITED, OF NEW KENT ROAD, ENGLAND.

ELECTROLYTE.

1,043,328.  Specification of Letters Patent.  Patented Nov. 5, 1912.

No Drawing.  Application filed May 10, 1912. Serial No. 696,484.

*To all whom it may concern:*

Be it known that I, WILLIAM HERBERT LOWE, a subject of the King of Great Britain, residing at 35 Mowbray road, Brondesbury, in the county of Middlesex, England, have invented certain new and useful Improvements in Electrolytes, of which the following is a specification.

This invention relates to improvements in electrolytes to be used in closed batteries, such as are described in U. S. Patent No. 940,734 of November 23, 1909.

In the specification of the British Patent No. 26649 of 1909, a process of making an electrolyte, which is similar to the electrolyte claimed in the United States Patent referred to above, is claimed. This process consists of first rendering bichromate of soda anhydrous, and then mixing it with concentrated sulfuric acid to form a hard mass. In this specification it is stated that preferably 32 ounces of anhydrous bichromate of soda are mixed with 18 fluid ounces of concentrated sulfuric acid.

I have discovered that an improved electrolyte is obtained by adding 28 ounces of anhydrous bichromate of soda in place of 32 ounces to the same quantity of sulfuric acid. Such an electrolyte is more efficient for use in the battery and withstands better any change of temperature. The hard mass formed may be ground to a powder and mixed with salt and water. I have also found that a better result is obtained if 5 ounces of salt are used in place of 4 as is stated in the above mentioned specification.

I claim:—

1. An electrolyte containing 28 ounces of anhydrous bichromate of soda and 18 fluid ounces of concentrated sulfuric acid.

2. An electrolyte consisting of 28 ounces of anhydrous bichromate of soda, 18 fluid ounces of concentrated sulfuric acid, and 5 ounces of salt to which is added water.

WILLIAM HERBERT LOWE.

Witnesses:
 R. HURST,
 M. GARRATT.

---

Copies of this patent may be obtained for five cents each, by addressing the "Commissioner of Patents, Washington, D. C."